No. 635,543. Patented Oct. 24, 1899.
J. B. HERR.
HOG CATCHER.
(Application filed June 5, 1899.)

(No Model.)

WITNESSES:
M. D. Blondel.
Percy B. Turpin.

INVENTOR
Josiah B. Herr.
BY Munn & Co.
ATTORNEYS.

UNITED STATES PATENT OFFICE.

JOSIAH B. HERR, OF NORTON, KANSAS.

HOG-CATCHER.

SPECIFICATION forming part of Letters Patent No. 635,543, dated October 24, 1899.

Application filed June 5, 1899. Serial No. 719,401. (No model.)

*To all whom it may concern:*

Be it known that I, JOSIAH B. HERR, of Norton, in the county of Norton and State of Kansas, have invented a new and useful Improvement in Hog-Catchers, of which the following is a specification.

My invention is an improvement in animal-catchers designed especially for use in catching hogs; and the invention consists in certain novel constructions and combinations of parts, as will be hereinafter described, and pointed out in the claim.

Figure 1:
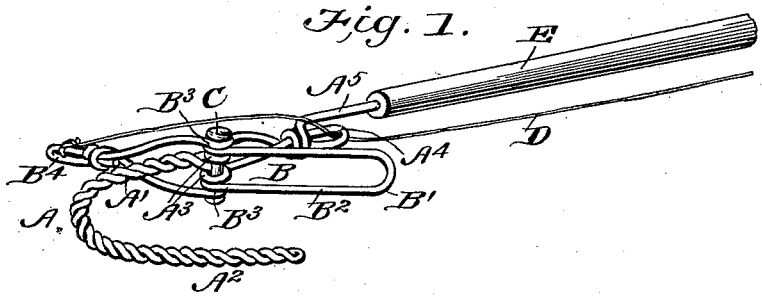
Figure 2:
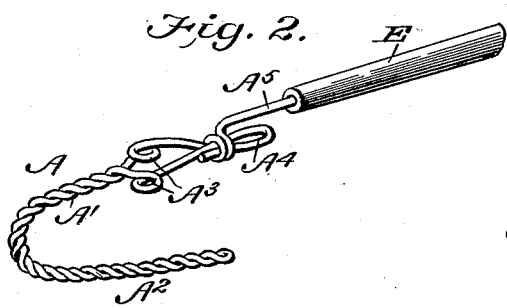
Figure 3:
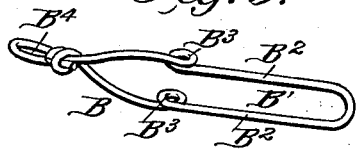
Figure 4:
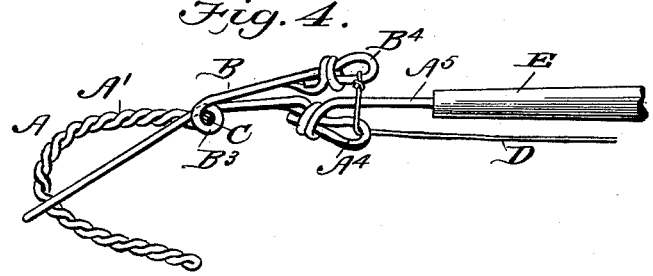

In the drawings, Figure 1 is a perspective view of the device. Fig. 2 is a detail perspective view of the hook. Fig. 3 is a detail perspective view of the latch, and Fig. 4 is a side view of the device.

The apparatus comprises the hook A and the latch B, which are pivoted together and operate in the manner shown in Fig. 1. The latch B has side bars $B^2$, which extend on opposite sides of the hook when the latch is closed and so form a broad bearing, which is brought into play in holding the animal's leg in the hook. The latch B, like the hook A, is preferably made of No. 5 steel-tempered wire bent to form the several portions of the latch and hook, as presently described.

The hook A is composed of a length of wire twisted together at A' and bent to form the re-turned hook proper, $A^2$. At the base of the twisted portion the wire is bent, forming the eyes $A^3$ for the bolt C, which pivots the latch B, and the wire is extended beyond said eyes and bent to form the loop $A^4$, forming a guide for the operating-cord D and the tang $A^5$ for connection with the handle E, which latter may be of any desired length.

The latch B is formed of wire bent to provide the loop B', having the side bars $B^2$, which lie on opposite sides of the hook when the latch is closed, and these side bars are bent to produce the eyes $B^3$ for the bolt C, and the latch has the arm $B^4$ for the connection of the operating-cord D. The cord D is secured to the arm $B^4$ and is carried back through the guide-loop $A^4$ and thence back along the handle E to the operator, where it may be drawn to close the hook when desired.

In operation the latch is opened and the hook is caught over the animal's leg and the latch closed by the cord, thus tightly grasping the leg and securely holding the animal.

The device is simple, easily constructed and operated, and efficiently serves the desired purpose.

Having thus described my invention, what I claim as new, and desire to secure by Letters Patent, is—

A device for catching animals consisting of the hook composed of a length of wire twisted together and bent to form the hook proper, bent forming the eyes for the latch-pivoting bolt and bent forming the guide-loop for the operating-line and the tang, the latch composed of the length of wire bent forming the intermediate eyes for the pivot-bolt, the loop forming the side bars lying on opposite sides of the tongue and the arm for the connection of the operating-cord, and the pivot-bolt connecting the latch and hook substantially as set forth.

JOSIAH B. HERR.

Witnesses:
SOPHIE LUTHER,
JAS. H. HURST.